Feb. 6, 1940.　　　　L. H. SURBECK　　　2,189,374
APPARATUS FOR FORMING THREE DIMENSIONAL IMAGES
Filed May 17, 1937　　　2 Sheets-Sheet 1
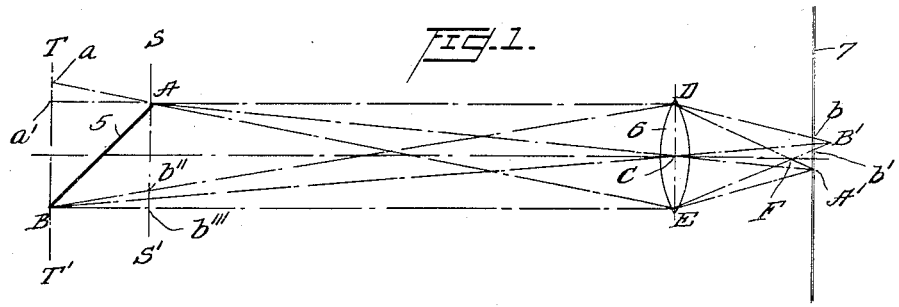
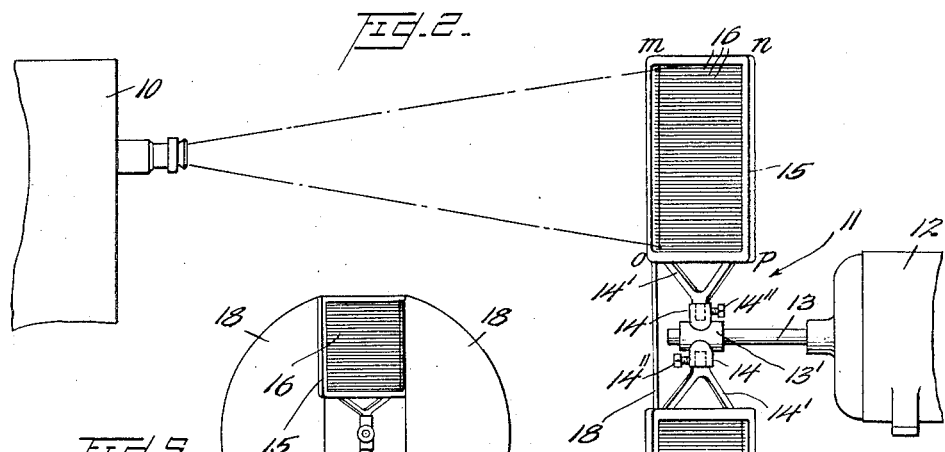
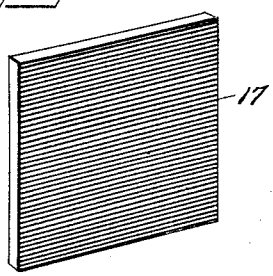
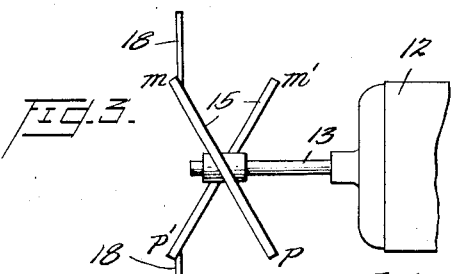

Feb. 6, 1940.   L. H. SURBECK   2,189,374
APPARATUS FOR FORMING THREE DIMENSIONAL IMAGES
Filed May 17, 1937   2 Sheets-Sheet 2
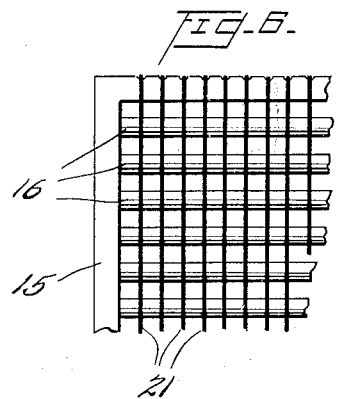
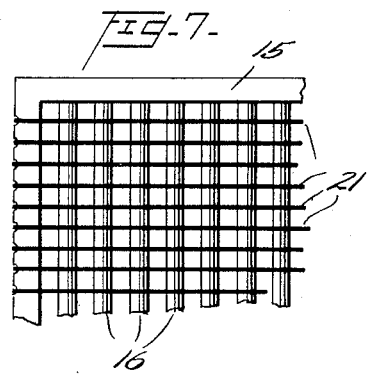
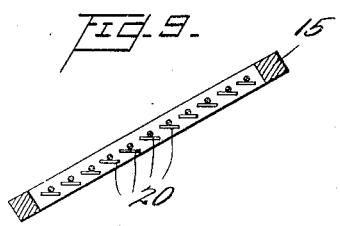
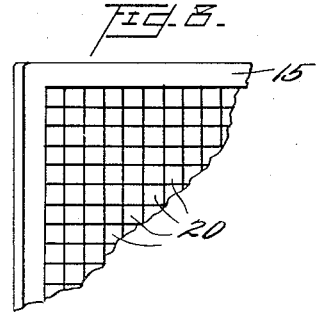
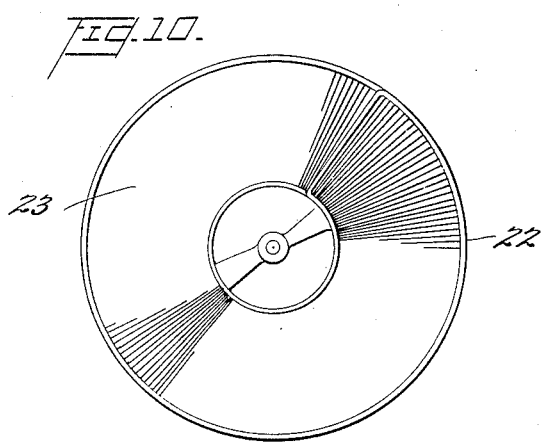
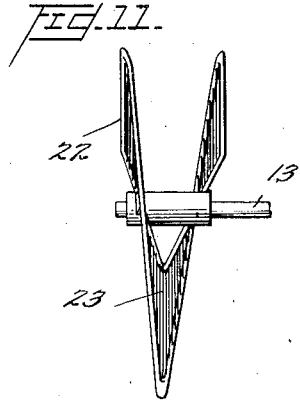
Inventor
Leighton Homer Surbeck
Watson, Cait.
By Moise & Grindle
Attorney Patented Feb. 6, 1940

2,189,374

UNITED STATES PATENT OFFICE 2,189,374

APPARATUS FOR FORMING THREE DIMENSIONAL IMAGES

Leighton Homer Surbeck, New York, N. Y.

Application May 17, 1937, Serial No. 143,187

7 Claims. (Cl. 88—24)

This invention relates to apparatus for projecting plate images, and more particularly for projecting such images so as to form a projected image in three dimensions or, in other words, having depth as well as breadth and height.

It is the general object of the present invention to provide means for projecting a plate image, such as an image recorded upon an ordinary photographic film, in such a way as to be visible as a three dimensional image corresponding more or less to the original object. A further object is the provision of a projection screen capable of receiving and making visible such three dimensional image.

Another object is the provision of a screen, for receiving three dimensional images in such a way as to render them visible either from the front of the screen (toward the projector) or the back.

A further object is the provision of means for carrying out the aforesaid objects in such a manner that the three dimensional images shall possess a proper perspective, and without the employment of the stereoscope principle, the projected images according to the present invention actually having three dimensions, enabling monocular perception of depth.

The present invention may be applied to the projection of either still or motion pictures.

Other and further objects, features, and advantages will be apparent from the description which follows taken in connection with the accompanying drawings in which:

Figure 1 is a diagram illustrating the theory at present believed to account for the success of the method and apparatus of the present invention;

Figure 2 is a side elevation of apparatus suitable for carrying out the present invention;

Figure 3 is a plan view of a projection screen according to the present invention;

Figure 4 illustrates a modification of the screen of Figures 2 and 3;

Figure 5 is a front elevation of the screen of Figures 2 and 3;

Figures 6, 7 and 8 are fragmentary elevations of modified forms of screen;

Figure 9 is a horizontal sectional view of the screen of Figure 8;

Figure 10 is a front elevation of a further modified form of screen; and

Figure 11 is a side elevation of the screen of Figure 10.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to Figure 1, I will describe briefly the theory which is believed to account for the behaviour of the apparatus to be later described, but it is to be understood that I do not desire to be bound by any theoretical considerations, the scope of the present invention being determined by the appended claims, without reference to theoretical matters.

The numeral 5 designates a diagrammatic representation of an object of which it is desired to record and project a three dimensional image, the points A and B representing points at different distances from the camera. The numeral 6 designates a convex lens, which may be first considered as the lens of a camera, a sensitive film 7 being positioned on the side of the lens 6 opposite the object 5. Assuming that the camera is accurately focussed on the point A, by well-known methods it may be determined that an image of the point A will be formed at A' on the film 7. Thus, to use the familiar ray method of demonstration, the ray ACA', passing through the center C of the lens 6, strikes the film 7 at A'. The parallel ray AD, after passing through the lens, will pass through the principal focus F, and will also strike the film 7 at A'. The point of intersection of these two rays determines the position of the image A'. Similarly it may be shown that, if the film 7 were not in the way, an image of point B would be formed at B', the point of intersection of the central ray BCB' and the parallel ray BE, the latter passing through the principal focus F after emerging from the lens 6.

Since the cone of rays emerging from point B and passing through the lens 6 are intercepted by the film 7, an out-of-focus image of point B will be formed and recorded on the film at bb'. The out-of-focus image bb' has been exaggerated in size for purposes of illustration, it being understood that the focal length of the ordinary camera lens is so short, as compared to the distance of the object from the camera, that true images of all points of the object will fall in or very near the plane of the film, and the recorded images of out-of-focus points will occupy very little more space on the film than if said points were all exactly in focus. The film thus shows such points as slightly blurred and appearing to merge into adjacent points.

Now if the image on the film is projected back through the lens 6, the image at A' will be formed in space at A, and the blurred image at bb' will be resolved into a sharp image in space at B. If the image is projected on a flat screen, as indicated by the broken line SS', the screen will receive a sharp image corresponding to point A of the original object, but the image b" b''', corresponding to point B of the object, will be blurred as on the film. On the other hand if the flat screen is positioned at TT', the image of point B will be sharp, but a blurred image aa' of point A will result. Thus it is possible, to a certain extent, in projecting a film of near and more distant objects, to select the points which it is desired to project sharply by varying the distance of the screen from the projector or, what amounts to the same thing, by varying the distance between the projector lens and the film. Whenever such a film is projected on a flat screen, only those parts of the image corresponding to points in a single plane can be sharply focussed on the screen, and the projected image thus lacks depth. On the other hand, if the film image is projected on a screen capable of receiving images at different distances from the projector, sharp images of all points of the object, within certain limits, will be formed on the screen, and the complete image will then have actual depth, which will be clearly perceptible to the observer.

The present invention provides a screen capable of receiving images at different distances from the projector, and so constructed and operated that, due to the phenomenon known as "persistence of vision," all points of the projected image will appear to be sharply focussed on said screen simultaneously, thus giving the observer the impression of a three dimensional image, and doing away with the objectionable "flat" effect of images projected on a flat screen.

Referring to Figure 2, a conventional projector is designated by the numeral 10, while the screen apparatus is indicated generally at 11. The latter comprises a motor 12 on whose shaft 13 is secured a sleeve 13' provided with a plurality of angularly spaced recessed bosses 14. Adjustably mounted in each boss 14 is a bracket 14', being secured in the desired angular relation to the shaft 13 by a set screw 14". Each bracket 14' carries a frame 15 which is thus disposed obliquely with respect to the shaft 13 and the axis of projection, as may be seen in Figure 3. Each frame 15 is provided with a series of parallel screen elements 16 comprising taut filaments such as threads, strings or wires, suitably secured at each end to the frame 15. The elements 16 are preferably separated by spaces approximately equal to their thickness or diameter. By energizing the motor 12, the several frames will be caused to pass rapidly through the field of projection, and if the latter is illuminated by ordinary white light, the rapid passage of the screen elements through the beam creates the visual impression of a series of spaced parallel planes extending away from the observer.

In order to prevent interfering images from being formed on surfaces behind the screen, by light passing between the several frames 15 as they rotate, opaque non-reflecting shields 18 are provided, as illustrated in Figures 3 and 5, being secured between adjacent edges of successive frames in any suitable manner.

If, now, an image is projected onto the moving screen, i. e., into the field of projection defined by the points m, n, o, p (Fig. 2) and m, m', p, p' (Fig. 3), the image will appear to have three dimensions, as may be demonstrated, for example, by shifting the point of observation. This phenomenon may be explained in the following manner, although it is to be understood that I do not desire to be bound by this explanation, but offer it only as the best explanation of the phenomenon now known to me:

Considering only a single element 16 of the screen, if such element is moved rapidly across the field of projection in a horizontal plane, and assuming that the field of projection has a depth in true proportion to that of the object photographed, it will be clear that every point of the narrow image received on the screen element 16 will, at some point in the travel of the latter, be accurately focussed thereon. In other words, considering a single point of said film image, as the element 16 passes through the field of projection, it will receive a projected image of said point along its entire length, progressively, and at some point in its travel the point on the element receiving said image will be spaced the correct distance from the projector so that said image will appear sharply focussed, in the correct plane corresponding to the position of said point in the original object.

The same is true for each other element 16 of the screen, and as an entire frame 15 passes through the field, innumerable points of the film image will be projected in accurate focus upon various points of the several screen elements, thus creating an image sufficiently complete to be apparently entire. At the same time, of course, the screen also receives a succession of out-of-focus images of various points of the film image, but the eye seems to select, or to retain, only the sharply formed images, so that the observer sees a sharp image of many points of the original object, at different depths, and the impression is that of viewing the object itself suspended in the field of projection.

Stated in another way, it may be said that the described apparatus provides a three dimensional image receiving field, in which each point of the image may assume its natural location in space, all of the points being visible by reason of the rapid movement of the actual screen elements and the phenomenon of persistence of vision. In this connection, however, it should be noted that for some reason of which the explanation is not now available, the projected image appears in the proper perspective whether viewed from the front or the rear of the screen. That is, in either case, far and near points of the object appear in proper relation in the image.

In the device as described above, the several screen elements of course do not pass horizontally through the field of projection, but the effect is the same, since each succeeding element takes up the image of any particular point where the last element left off.

In many cases it is impractical to make the depth of the screen proportional to the depth of the original object. In such cases, parts of the image will be slightly out of focus, but the perception of depth will nevertheless be possible to a degree depending upon the depth of the screen.

An interesting feature of the present invention is that an image projected as described is visible from the rear of the screen, i. e., from the side away from the projector, as well as from the front. In fact, the effect is somewhat better when viewed from the rear of the screen, since the point of observation may be shifted further from the axis of projection without destroying the desired effect. Viewing the image from the rear, however, has the disadvantage that one must look more or less directly into the projection light, and a certain amount of glare may be experienced. However, this disadvantage may be overcome by substituting, for the frames 15, sheets of ground glass 17 (Fig. 4) ruled with black or opaque lines corresponding to the spaces between the elements 16. The use of this modified form of screen results in the same phenomenon of depth perception as already described.

In fact, almost any plane reflecting surface, ruled with non-reflecting lines, may be used in place of the frames 15 and elements 16, it being understood that a translucent material must be employed if it is desired to view the image from behind the screen. It is desirable to darken the edges of the screen nearest the projector, in order to prevent the formation of a flat screen effect in the plane of such edges. Thus, in the form of screen illustrated in Figures 2 and 3, the frames 15 are preferably formed or coated with non-reflecting materials.

It will be obvious that any suitable means for moving the several frames 15 or sheets 17 through the field of projection may replace the motor 12. For example, the several frames or sheets may be passed horizontally through the field by suitable mechanism. Other arrangements may be employed, the prime consideration being to pass a series of small elements through the projection field in such a way that each point of the image will be received at a succession of varying distances from the projector.

Other forms of screen which will serve in place of that described above are shown in Figures 6 to 11, inclusive. Figures 8 and 9 illustrate a screen frame in which a plurality of small flat elements 20 are arranged in vertical rows, the successive rows being arranged in echelon, or "stepped back", as seen in Figure 9. This form of screen is not adapted to viewing the image from the rear, but is advantageous in viewing it from the front, since the flat elements provide excellent reflecting surfaces.

An effect somewhat similar to the screen of Figures 8 and 9 is illustrated in Figure 6, which shows a screen otherwise similar to that of Figures 2 and 3, but having slender non-reflecting filaments 21 stretched across its face at 90° to the screen elements 16, thus substantially converting the latter into a plurality of short, square-appearing elements.

In Figure 7, the elements 16 have been arranged vertically and the filaments 21 horizontally. The visual effects created by the screens of Figures 6 and 7 are substantially identical, but the images received by such screens appear somewhat darker than those of Figures 2 and 3, due to the presence of the non-reflecting filaments 21. If desired, the latter may be omitted from the screen of Figure 7, as in the case of Figures 2 and 3.

Figures 10 and 11 illustrate a screen comprising a helical frame 22 provided with radial screen elements 23. Such a screen will give a bright image, since the projection beam is continuously reflected. It will be understood that, no matter which type of screen is employed, in the case of motion pictures the speed of the apparatus must be such that a whole number of screen frames, and at least one complete frame, must be passed through the projection beam for each individual "frame" or picture of the film.

Any desired number of screen frames of the types shown in Figures 2–9, inclusive, may be employed, so long as the required conditions for persistence of vision are observed. Other modifications in the manner of applying the present invention will occur to those skilled in the art to which it pertains.

Having thus described the invention, what is claimed as new and desired to be secured by Letters Patent is:

1. A projection screen comprising a frame, a plurality of closely spaced reflecting elements carried by said frame, means to support said frame for movement across the light axis, means to position said frame to place said elements at a desired angle to the light axis, and means to rapidly move the frame through the projected light beam.

2. A projection screen comprising a frame, a plurality of closely spaced parallel lineated reflecting elements carried by said frame, means to support said frame for movement across the light axis, means to position said frame to place said elements at a desired angle to the light axis, and means to rapidly move the frame through the projected light beam.

3. A projection screen comprising a frame, a plurality of closely spaced alternate light transmitting and reflecting elements carried by said frame, means to support said frame for movement across the light axis, means to position said frame to place said elements at a desired angle to the light axis, and means to rapidly move the frame through the projected light beam.

4. A projection screen comprising a frame, a plurality of closely spaced alternate light transmitting and obstructing elements carried by said frame, means to support said frame for movement across the light axis, means to position said frame to place said elements at a desired angle to the light axis, and means to rapidly move the frame through the projected light beam.

5. A projection screen comprising a frame, a plurality of closely spaced reflecting elements carried by said frame and constituted by a sheet of reflecting material having spaced parallel non-reflecting lines inscribed thereon, means to support said frame for movement across the light axis, means to position said frame to place said reflecting elements at a desired angle, and means to rapidly move the frame through the projected light beam.

6. A projection screen comprising a frame, a plurality of closely spaced reflecting elements carried by said frame and constituted by a sheet of translucent reflecting material having spaced parallel non-reflecting lines inscribed thereon, means to support said frame for movement across the light axis, means to position said frame to place said reflecting elements at a desired angle, and means to rapidly move the frame through the projected light beam.

7. A projection screen comprising a frame, a plurality of closely spaced reflecting elements carried in echelon by said frame, means to support said frame for movement across the light axis, means to position said frame to place said elements at a desired angle to the light axis, and means to rapidly move the frame through the projected light beam.

LEIGHTON HOMER SURBECK.